United States Patent
Shimura

(10) Patent No.: US 10,091,365 B2
(45) Date of Patent: Oct. 2, 2018

(54) IMAGE FORMATION APPARATUS, IMAGE FORMATION SYSTEM AND MANAGEMENT APPARATUS CONFIGURED TO PERFORM IMAGE QUALITY VERIFICATION AND ADJUSTMENT

(71) Applicant: Konica Minolta, Inc., Chiyoda-ku, Tokyo (JP)

(72) Inventor: Hiroshi Shimura, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/251,676

(22) Filed: Aug. 30, 2016

(65) Prior Publication Data
US 2017/0064096 A1    Mar. 2, 2017

(30) Foreign Application Priority Data
Sep. 1, 2015    (JP) ................. 2015-172287

(51) Int. Cl.
*H04N 1/00* (2006.01)
*H04N 1/23* (2006.01)
(Continued)

(52) U.S. Cl.
CPC ....... *H04N 1/00005* (2013.01); *G06F 3/1204* (2013.01); *G06F 3/1205* (2013.01);
(Continued)

(58) Field of Classification Search
CPC .......... H04N 1/00007; H04N 1/00015; H04N 1/00023; H04N 1/00026–1/00092;
(Continued)

(56) References Cited

U.S. PATENT DOCUMENTS 6,018,397 A * 1/2000 Cloutier ............. H04N 1/00132
  358/1.1
6,707,574 B1 * 3/2004 Freeman ............... G06F 3/1204
  358/1.3
(Continued)

FOREIGN PATENT DOCUMENTS

JP    09-281855    10/1997
JP    2006-250980    9/2006
(Continued)

OTHER PUBLICATIONS

Machine Translation to English of JP 2010-131938 A.*
(Continued)

*Primary Examiner* — Scott A Rogers
(74) *Attorney, Agent, or Firm* — Buchanan Ingersoll & Rooney PC

(57) ABSTRACT

An image formation apparatus includes: an image formation unit that forms an image based on a job; and a control unit that controls the image formation unit, the control unit having an image quality verification/adjustment function to compare an image quality of the scanned image and a predetermined image quality standard, and to carry out an image quality adjustment such that the image quality of the image is within an allowable range of the predetermined image quality standard when the image quality of the scanned image is not within the allowable range, the control unit comparing a required image quality for the job and the predetermined image quality standard before a carrying-out procedure to carry out the image quality verification/adjustment function before execution of the job as necessary, and deciding whether the image for the job satisfies the required image quality by the image quality verification/adjustment function.

19 Claims, 6 Drawing Sheets

(51) Int. Cl.
*G06F 3/12* (2006.01)
*G06K 15/02* (2006.01)
*H04N 1/60* (2006.01)

(52) U.S. Cl.
CPC .......... *G06F 3/1207* (2013.01); *G06F 3/1219* (2013.01); *G06F 3/1253* (2013.01); *G06F 3/1255* (2013.01); *G06F 3/1258* (2013.01); *G06F 3/1259* (2013.01); *G06K 15/1809* (2013.01); *G06K 15/1822* (2013.01); *G06K 15/1825* (2013.01); *G06K 15/1868* (2013.01); *H04N 1/00015* (2013.01); *H04N 1/00031* (2013.01); *H04N 1/00034* (2013.01); *H04N 1/0048* (2013.01); *H04N 1/00063* (2013.01); *H04N 1/00074* (2013.01); *H04N 1/00082* (2013.01); *H04N 1/00084* (2013.01); *H04N 1/00092* (2013.01); *H04N 1/00477* (2013.01); *H04N 1/00482* (2013.01); *H04N 1/233* (2013.01); *H04N 1/2323* (2013.01); *H04N 1/2338* (2013.01); *H04N 1/2346* (2013.01); *H04N 1/2353* (2013.01); *H04N 1/2376* (2013.01); *H04N 1/2392* (2013.01); *G06K 15/1878* (2013.01); *H04N 1/00023* (2013.01); *H04N 1/00045* (2013.01); *H04N 1/6036* (2013.01); *H04N 2201/0091* (2013.01)

(58) Field of Classification Search
CPC ....................... H04N 1/00408–1/00432; H04N 1/00474–1/0049; H04N 1/2307–1/2392; H04N 1/6033; H04N 1/6036; G06F 3/1203; G06F 3/1204; G06F 3/1205; G06F 3/1207; G06F 3/1208; G06F 3/121; G06F 3/1218; G06F 3/1219; G06F 3/122; G06F 3/1221; G06F 3/1229; G06F 3/1237; G06F 3/1253; G06F 3/1255; G06F 3/1256; G06F 3/1258; G06F 3/1259; G06F 3/1275; G06K 15/021; G06K 15/027; G06K 15/1803–15/1809; G06K 15/1822; G06K 15/1823; G06K 15/1856; G06K 15/186; G06K 15/4025
See application file for complete search history.

(56) References Cited

U.S. PATENT DOCUMENTS

| | | | | |
|---|---|---|---|---|
| 7,139,086 | B1* | 11/2006 | Whitmarsh | H04N 1/00132 358/1.15 |
| 7,317,882 | B2* | 1/2008 | Dombrowski | G03G 15/6508 399/391 |
| 7,436,532 | B2* | 10/2008 | Tsujimoto | G06K 15/005 358/1.15 |
| 7,742,200 | B2* | 6/2010 | Eschbach | H04N 1/00002 348/224.1 |
| 7,751,072 | B2* | 7/2010 | Anderson | G03G 15/50 358/1.13 |
| 7,760,385 | B2* | 7/2010 | Yamaguchi | G06F 3/1208 358/1.13 |
| 8,233,178 | B2* | 7/2012 | Robinson | G06Q 10/06315 358/1.15 |
| 8,259,350 | B2* | 9/2012 | Wu | H04N 1/00002 347/120 |
| 8,543,915 | B2* | 9/2013 | Liu | G06F 3/1207 715/274 |
| 9,036,215 | B2* | 5/2015 | Ishizuka | G03G 15/5058 358/1.9 |
| 9,292,234 | B2* | 3/2016 | Ward | G06F 3/121 |
| 2013/0301083 | A1* | 11/2013 | Kaneda | H04N 1/00005 358/406 |
| 2016/0154357 | A1* | 6/2016 | Naruse | G03G 15/5029 358/1.5 |
| 2017/0068875 | A1* | 3/2017 | Gerrits | G06K 15/1836 |

FOREIGN PATENT DOCUMENTS

| | | | | |
|---|---|---|---|---|
| JP | 2010-066516 A | | 3/2010 | |
| JP | 2010-131938 | | 6/2010 | |
| JP | 2010-274569 | | 12/2010 | |
| JP | 2012068998 A | * | 4/2012 | |
| JP | 2012068999 A | * | 4/2012 | |
| JP | 2014-146859 A | | 8/2014 | |
| JP | 2015-077763 A | | 4/2015 | |
| JP | 2016150549 A | * | 8/2016 | ......... B29C 67/0059 |

OTHER PUBLICATIONS

Notification of Reasons for Refusal issued in corresponding Japanese Patent Application No. 2015-172287, dated Aug. 8, 2017, with English Translation (16 pages).

\* cited by examiner

IMAGE FORMATION APPARATUS, IMAGE FORMATION SYSTEM AND MANAGEMENT APPARATUS CONFIGURED TO PERFORM IMAGE QUALITY VERIFICATION AND ADJUSTMENT

The present U.S. patent application claims a priority under the Paris Convention of Japanese patent application No. 2015-172287 filed on Sep. 1, 2015, the entirety of which is incorporated herein by references.

BACKGROUND OF THE INVENTION

Field of the Invention

The present invention relates to an image formation apparatus, an image formation system and a management apparatus that allow for an image quality adjustment in an image formation unit.

Description of the Related Art

When printing is performed by an image formation apparatus, an image is typically formed using an output profile fit for the apparatus, a generic output profile or the like.

However, the image formation condition sometimes changes temporarily or gradually along with the operation of the image formation apparatus. Therefore, a color profile is applied to printing data to be output, the patch of the output image is detected by a color density sensor or the like, and the adjustment is carried out such that the result is within a predetermined range.

For example, image patches and the like are formed on a transfer paper each for a predetermined time, a predetermined printing count or the like in the operation of the image formation apparatus, these are scanned by a line sensor or the like, the state of the image and the image formation condition are compared, and whether the image is properly formed is decided. In the case where the image is not formed exactly in accordance with the image formation condition and a gap appears, the quality of the image is maintained by the calibration of the image formation condition or the like.

In Japanese Patent Laid-Open No. 2010-066516, a sample paper ejection is performed, and the check of the color tone is performed. Thereafter, if a user makes the judgement of OK, the scan is performed in a standard image data scan mode, and the image quality decision is performed during printing while the scanned data is adopted as the standard. An image for which the decision of NG is made is ejected to another tray.

By the way, in the printing for a job, it is sometimes possible to require the level of printing quality such as image quality, and in this case, the printing according to the requirement of the printing quality level is performed in the image formation apparatus. However, the printing quality level required for the job sometimes varies depending on the job, and it is unknown whether the printing quality level is fit for the standard of the image quality set in the image formation apparatus. The above-described Japanese Patent Laid-Open No. 2010-066516 relates to a single job, and cannot perform the decision for another job.

In such a state, the image quality cannot sometimes fall within the allowable tolerance no matter how much the automatic adjustment of the image quality is performed, and in this case, there is a problem in that the adjustment is in vain and a printed matter having an intended quality is not obtained.

SUMMARY OF THE INVENTION

The present invention has been made in view of the above circumstance, and has an object to provide an image formation apparatus, an image formation system and a management apparatus that allow for the avoidance of the vain adjustment by performing a decision considering the required quality for a job, before a procedure for the image quality adjustment.

To achieve at least one of the abovementioned objects, according to an aspect, an image formation apparatus reflecting one aspect of the present invention includes: an image formation unit that forms an image on a transfer medium based on a job; and a control unit that controls the image formation unit, the control unit having an image quality verification/adjustment function to compare, based on a scan result for the image formed by the image formation unit, an image quality of the scanned image and a predetermined image quality standard, and to carry out an image quality adjustment of the image formation unit such that the image quality of the image is within an allowable range of the predetermined image quality standard, in a case where the image quality of the scanned image is not within the allowable range of the predetermined image quality standard, the control unit having a carrying-out procedure to carry out the image quality verification/adjustment function before execution of the job as necessary, comparing a required image quality to be required for the job and the predetermined image quality standard before the carrying-out procedure, and deciding whether the image for the job satisfies the required image quality by the image quality verification/adjustment function.

In the image formation apparatus according to the abovementioned aspect, it is preferable that the control unit performs a warning in a case of judging that the image for the job is unable to satisfy the required image quality even by the image quality verification/adjustment function in the decision.

In the image formation apparatus according to the abovementioned aspect, it is preferable that the image formation apparatus includes a display unit that is controlled by the control unit, and the control unit displays the warning on the display unit.

In the image formation apparatus according to the abovementioned aspect, it is preferable that the required image quality is associated with the type of transfer medium to be used for the job, and the predetermined image quality standard is associated with the type of transfer medium to be used for printing.

In the image formation apparatus according to the abovementioned aspect, it is preferable that the control unit presents an alternative transfer medium in a case of judging that the image for the job is unable to satisfy the required image quality even by the image quality verification/adjustment function in the decision, the alternative transfer medium allowing the image for the job to satisfy the required image quality by the image quality verification/adjustment function.

In the image formation apparatus according to the abovementioned aspect, it is preferable that the control unit performs a decision of whether to carry out the image quality verification/adjustment in the carrying-out procedure for the image quality verification/adjustment function, in a case of judging that the image for the job is able to satisfy the required image quality by the image quality verification/adjustment function.

In the image formation apparatus according to the abovementioned aspect, it is preferable that a decision of whether to carry out the image quality verification/adjustment is performed by an operation instruction by a user or automatically performed in consideration of an image quality change in the image formation unit.

In the image formation apparatus according to the abovementioned aspect, it is preferable that the image quality change is decided based on a printing count for the transfer medium or an operating time of the image formation unit after the image quality adjustment.

In the image formation apparatus according to the abovementioned aspect, it is preferable that the control unit performs a decision of whether to perform the image quality adjustment, in the image quality verification/adjustment, after comparing the image quality of the scanned image and the predetermined image quality standard.

In the image formation apparatus according to the abovementioned aspect, it is preferable that the control unit performs the decision of whether to carry out the image quality adjustment depending on an operation instruction by a user, or automatically performs the decision according to the comparison result.

In the image formation apparatus according to the abovementioned aspect, it is preferable that the control unit performs the adjustment until the image quality of the scanned image becomes at least equal to or higher than the required image quality, in a case of deciding that the image for the job is able to satisfy the required image quality by the image quality verification/adjustment function and performing the image quality verification/adjustment.

In the image formation apparatus according to the abovementioned aspect, it is preferable that the control unit carries out the image quality verification/adjustment until the scanned image becomes within the allowable range of the predetermined image quality standard.

In the image formation apparatus according to the abovementioned aspect, it is preferable that the control unit displays a mark on an indication of a tray, in a case of deciding that the image for the job is able to satisfy the required image quality by the image quality verification/ adjustment function, the tray being a tray from which a transfer medium to be used for the job is fed.

In the image formation apparatus according to the abovementioned aspect, it is preferable that the control unit displays a mark on an indication of a tray, in a case where the image quality of the scanned image satisfies the required image quality as a result of the image quality adjustment, the tray being a tray from which a transfer medium to be used for the job is fed.

In the image formation apparatus according to the abovementioned aspect, it is preferable that the control unit makes the mark disappear, in a case where the transfer medium to be used is altered, in a case where the job is completed or in a case where a fixed time has elapsed.

In the image formation apparatus according to the abovementioned aspect, it is preferable that the control unit records information about time when the image quality adjustment is performed, and allows timing of the last image quality adjustment to be checked.

In the image formation apparatus according to the abovementioned aspect, it is preferable that the scan result for the image is a result by a scan apparatus that is included in the image formation apparatus, or a result that is externally detected.

To achieve at least one of the abovementioned objects, according to an aspect, an image formation system reflecting one aspect of the present invention includes: an image formation unit that forms an image on a transfer medium based on a job; and a control unit that controls the image formation unit, the control unit having an image quality verification/ adjustment function to compare, based on a scan result for the image formed by the image formation unit, an image quality of the scanned image and a predetermined image quality standard, and to carry out an image quality adjustment the image formation unit such that the image quality of the image is within a predetermined allowable range of the predetermined image quality standard, in a case where the image quality of the scanned image is not within the allowable range of the predetermined image quality standard, the control unit further having a carrying-out procedure for the image quality verification/adjustment function before execution of the job, comparing a required image quality to be required for the job and the predetermined image quality standard before the carrying-out procedure, and deciding whether the image for the job satisfies the required image quality by the image quality verification/adjustment function.

To achieve at least one of the abovementioned objects, according to an aspect, a management apparatus reflecting one aspect of the present invention is a management apparatus that manages an image formation apparatus, the management apparatus including:

a communication unit that communicates with the image formation apparatus; and a control unit that controls an image formation unit, the image formation unit forming an image on a transfer medium based on a job through the communication unit, the control unit having an image quality verification/ adjustment function to compare, based on a scan result for the image formed by the image formation unit, an image quality of the scanned image and a predetermined image quality standard, and to make the image formation unit carry out an image quality adjustment such that the image quality of the image is within a predetermined allowable range of the predetermined image quality standard, in a case where the image quality of the scanned image is not within the allowable range of the predetermined image quality standard, the control unit further having a carrying-out procedure for the image quality verification/adjustment function before execution of the job, comparing a required image quality to be required for the job and the predetermined image quality standard before the carrying-out procedure, and deciding whether the image for the job satisfies the required image quality by the image quality verification/adjustment function.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Hereinafter, an embodiment of the present invention will be described with reference to the drawings. However, the scope of the invention is not limited to the illustrated examples.

Hereinafter, an embodiment of the present invention will be described based on the accompanying drawings.

Figure 1:
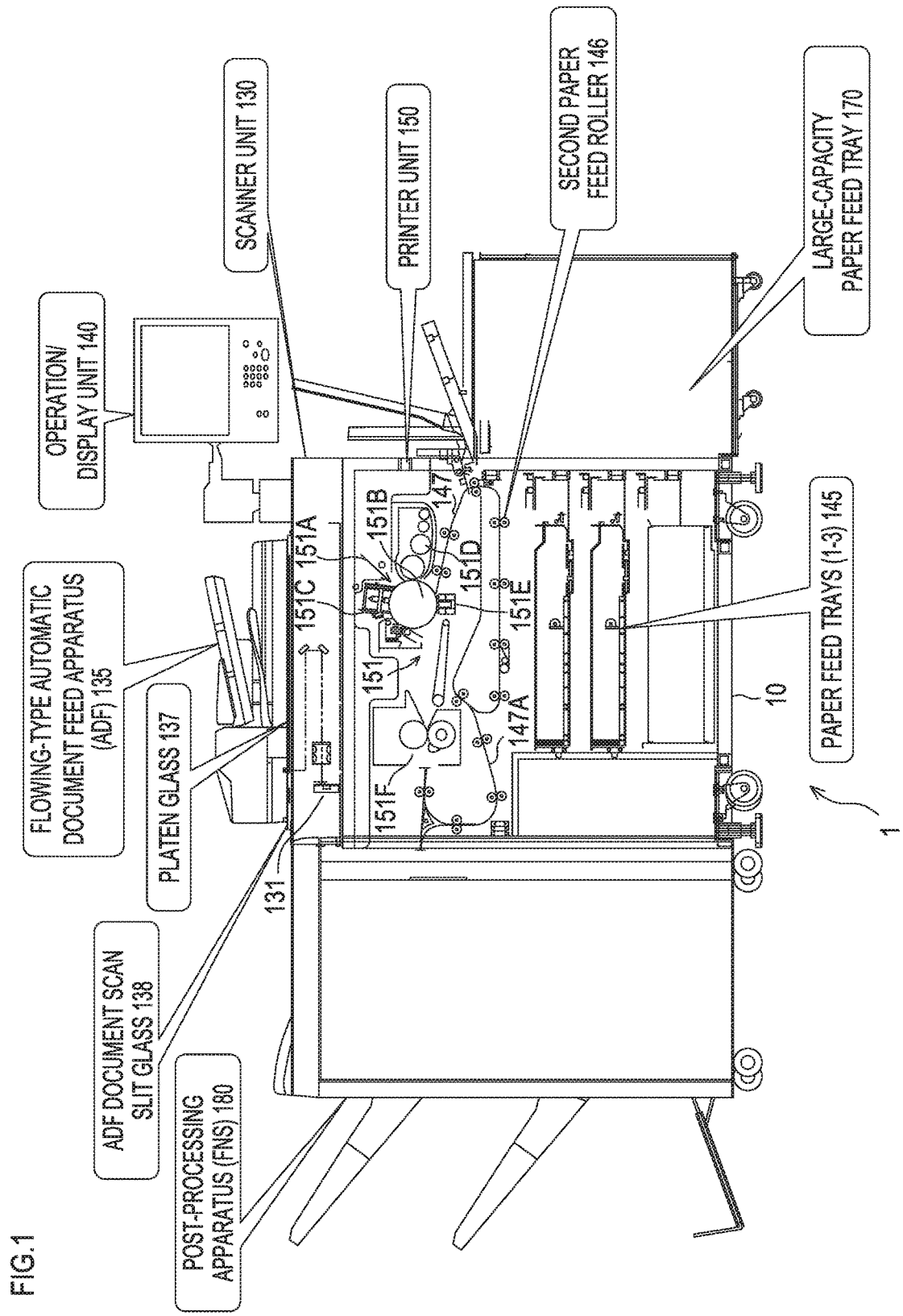
FIG. 1 is a schematic view showing the mechanical configuration of an image formation apparatus in an embodiment of the present invention.

FIG. 1 is a central cross-section view of the whole of an image formation apparatus, and shows the mechanical configuration. In the following, the configuration will be described.

In an image formation apparatus 1, the former side of an image formation apparatus body 10 is connected with a large-capacity paper feed tray 170, and the latter side of the image formation apparatus body 10 is connected with a post-processing apparatus (FNS) 180. The image formation apparatus 1 allows for the conveyance of a paper sheet among the apparatuses, and allows for the communication with each other. Here, the post-processing apparatus can be incorporated in the image formation apparatus body 10.

In the image formation apparatus body 10, a scanner unit 130 including a CCD 131 and a flowing-type automatic document feed apparatus (ADF) 135 are provided on the upper side, and it is possible to perform the image scan for a document through a platen glass 137 and an ADF document scan slit glass 138.

An image scan unit is constituted by the above scanner unit 130, flowing-type automatic document feed apparatus (ADF) 135, platen glass 137 and ADF document scan slit glass 138, and the like.

Further, on the upper side of the image formation apparatus body 10, an operation/display unit 140 provided with a touch panel on a LCD is provided at a place where the platen glass 137 is not positioned, allowing for the operation by an operator and the display of information. The operation/display unit 140 constitutes an operation unit, and concurrently serves as a display unit in the present invention. Here, in the present invention, the operation unit and the display unit can be configured independently.

On the lower side of the image formation apparatus body 10, a plurality of paper feed trays (1-3) 145 (three stages in the figure) are arranged, and further, a large-capacity paper feed tray 170 having a paper feed tray is arranged so as to be attached to the image formation apparatus body 10.

A conveyance path 147 through which a paper sheet fed from one paper feed tray is conveyed, a second paper feed roller 146 and the like are provided in the image formation apparatus body 10, and an image formation unit 151 constituted by an LD 151A, a photoreceptor 151B, a charging device 151C, a developing device 151D, a transfer unit 151E, a fixing device 151F and the like is provided on the way of the conveyance path in the image formation apparatus body 10.

Further, a conveyance path (not illustrated) for conveying and leading each fed paper sheet into the image formation apparatus body 10 is provided in the large-capacity paper feed tray 170. Furthermore, the post-processing apparatus (FNS) 180 has a conveyance path for conveying a paper sheet on which an image is printed and ejecting the paper sheet without performing post-processing or after performing post-processing.

In each conveyance path, a conveyance unit in the present invention is constituted by a conveyance roller for conveying a paper sheet, a conveyance motor and the like.

Further, a printer unit 150 in the present invention is constituted by the image formation unit 151, the paper feed trays (1-3) 145, the large-capacity paper feed tray 170, the conveyance path 147, the second paper feed roller 146 and the like.

In the image formation unit 151, the charging device 151C, the developing device 151D and the transfer unit 151E are arranged around the photoreceptor 151B. The charging device 151C uniformly charges the surface of the photoreceptor 151B, before image writing. The LD 151A irradiates the photoreceptor 151B having the surface uniformly charged, with a semiconductor laser, and thereby, forms an electrostatic latent image on the photoreceptor 151B. The developing device 151D develops the electrostatic latent image formed on the photoreceptor 151B by the LD 151A, with a toner member. By the development processing, a toner image is formed on the photoreceptor 151B. The transfer unit 151E transfers the toner image on the photoreceptor 151B, to the paper sheet conveyed from the paper feed trays (1-3) 145 or the large-capacity paper feed tray 170 through the conveyance path 147. The paper sheet after the transfer of the toner image is separated from the photoreceptor 151B, and is conveyed to the fixing device 151F. The residual toner member on the photoreceptor 151B is removed by a cleaning unit not illustrated.

The fixing device 151F heats the conveyed paper sheet, and thereby, fixes the toner image transferred on the front surface side of the paper sheet. In the case of simplex printing, the paper sheet after the fixation processing, with no change, is conveyed to the post-processing apparatus (FNS) 180 positioned on the lateral side of the image formation apparatus body 10, through the conveyance path 147.

The post-processing apparatus (FNS) 180 performs post-processing such as stapling, punching, mid-folding and bookbinding, and the like. In the present invention, the content of the post-processing is not particularly limited, and it is allowed to exclude the post-processing apparatus.

On the other hand, in the case of duplex printing, the paper sheet after the fixation is switched back by a reverse conveyance path 147A, and a predetermined image is transferred on the back surface side of the paper sheet by the image formation unit 151. Then, after the fixation, the paper sheet having the images formed on both surfaces is conveyed to the post-processing apparatus (FNS) 180. The post-processing apparatus (FNS) 180 has a plurality of paper ejection trays, which correspond to paper ejection destinations. Further, in the case where the post-processing apparatus (FNS) 180 includes a stacker or the like, the stacker also corresponds to a paper ejection destination.

The above image formation apparatus 1 is constituted by the image formation apparatus body 10, the large-capacity paper feed tray 170 and the post-processing apparatus (FNS) 180. However, in the present invention, as for apparatuses and the like constituting the image formation apparatus, the number and the type are not particularly limited. It is allowed to include a plurality of post-processing apparatuses, and it is allowed to connect various post-processing apparatuses such as a relay apparatus and a stack apparatus, additionally. Furthermore, it is allowed to incorporate the post-processing apparatus in the image formation apparatus body, and it is allowed to exclude the post-processing apparatus in the image formation apparatus.

Figure 2:
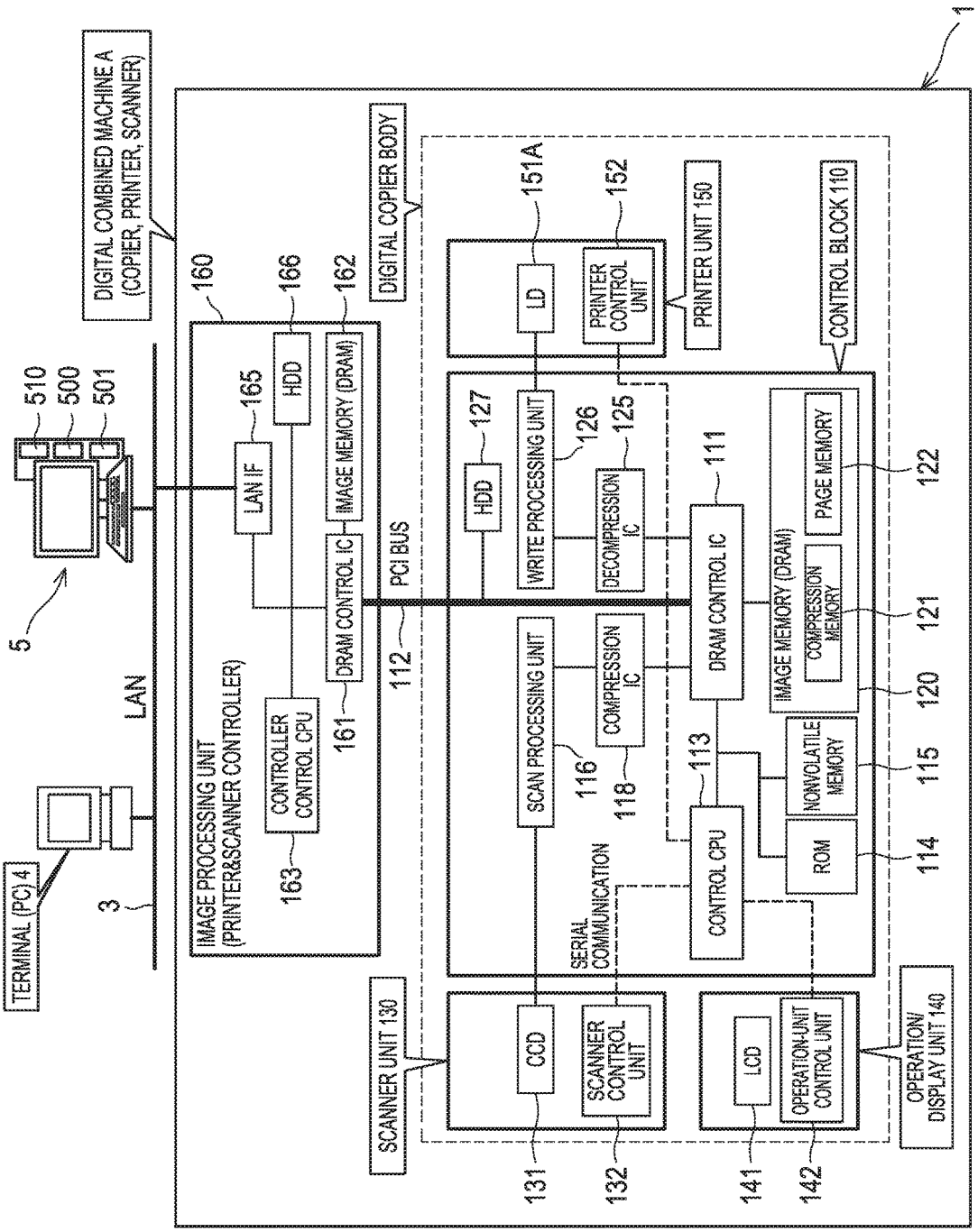
FIG. 2 is a diagram showing a control block of the image formation apparatus in the same.

FIG. 2 is a diagram showing the circuit block of the image formation apparatus 1 functioning as a digital combined machine (a copier, a printer and a scanner) and the network configuration configuring an image formation system, and the content will be described in detail below.

The image formation apparatus 1 includes a digital copier body that has a control block 110, the scanner unit 130, the operation/display unit 140 and the printer unit 150, and an image processing unit (printer & scanner controller) 160 that processes the image data input from an external machine such as a terminal (PC) 4 through a LAN 3 and that can transfer the image data obtained in the scanner unit 130, to the external machine such as the terminal (PC) 4 through the LAN 3.

Further, the LAN 3 can include a management apparatus 5 that manages the image formation apparatus 1.

The image formation apparatus 1, the terminal (PC) 4 and the management apparatus 5 constitute the image formation system in the present invention. As the image formation system, it is allowed to exclude the terminal (PC) 4 or to exclude the management apparatus 5.

The control block 110 has a PCI bus 112 connected with the image processing unit (printer & scanner controller) 160, and the PCI bus 112 is connected with a DRAM control IC 111. The DRAM control IC 111 is connected with an image memory including a compression memory 121 and a page memory 122. The compression memory 121 is a memory for storing the compressed image data of job management information, documents and the like. The page memory 122 is a memory for temporarily storing the non-compressed image data to be printed before image formation.

Further, jobs and the like generated by the terminal (PC) 4 and the like connected with the image formation apparatus 1 and the image processing unit (printer & scanner controller) 160 are saved in a HDD 127 connected with the PCI bus 112. In the HDD 127, a plurality of jobs can be saved. Each job includes the information about the whole of the job, the information for each page, the image data and the printing condition.

Further, the control block 110 includes a control CPU 113, and the DRAM control IC 111 is connected with the control CPU 113.

Further, the control CPU 113 is connected with a ROM 114 and a nonvolatile memory 115. The nonvolatile memory 115 stores the initial print setting information of the image formation apparatus 1, the output profile information, the machine setting information such as process control parameters for actualizing an image quality verification/adjustment function and the like, user setting values, the paper sheet setting information (predetermined image quality standards such as paper sheet size and paper sheet type) for each paper feed tray, the paper sheet profile information, the management information for reserved jobs, and the like, in a readable and writable manner. The ROM 114 stores a program for making the above control CPU 113 execute a predetermined behavior, and the like, in a readable manner.

The control CPU 113 can read the nonvolatile data in the ROM 114 and the nonvolatile memory 115, and can write intended data in the nonvolatile memory 115 as nonvolatile data. The control CPU 113 controls the behavior of each unit of the image formation apparatus 1, in accordance with the above machine setting information, print setting information and job management information, and the like.

The control CPU 113 controls the whole of the image formation apparatus 1, and constitutes the control unit in the present invention, together with the ROM 114, the nonvolatile memory 115 and the like. The control CPU 113 performs a control for actualizing the image quality verification/adjustment function. Further, the control CPU 113 performs management controls such as the reservation and execution of jobs stored in the HDD 127 and the compression memory 121.

The ROM 114, the nonvolatile memory 115, the HDD 127, a non-illustrated RAM and the like correspond to a storage unit, and in the storage unit, the data relevant to jobs, the paper sheet setting information for each paper feed tray, the paper sheet profile information, the association information between a printing quality level (required image quality) and a paper sheet, and the like are stored, as described above.

The scanner unit 130 includes the CCD 131 that performs optical scan, and a scanner control unit 132 that performs the control of the whole of the scanner unit 130. The scanner control unit 132 is connected with the control CPU 113, such that serial communication is possible. Further, the CCD 131 is connected with a scan processing unit 116 that processes the image data scanned by the CCD 131, the scan processing unit 116 is connected with a compression IC 118 that performs the compression processing of the image data, and the compression IC 118 is connected with the above DRAM control IC 111.

The operation/display unit 140 performs display and operation concurrently, corresponds to the display/operation unit in the present invention, and includes an LCD 141 that has a touch panel and an operation-unit control unit 142 that controls the whole of the operation unit. The operation-unit control unit 142 is connected with the control CPU 113, such that serial communication is possible. By the control from the control CPU 113, the operation/display unit 140, through the LCD 141, allows for the input of the machine setting such as the print setting and behavior control condition in the image formation apparatus 1, the setting relevant to output or the like, the setting (size and paper sheet type) of the paper sheet information for each paper feed tray, the output mode setting (for example, a normal copy mode or a confirmation copy mode), the setting of the required image quality in job execution, the setting of the image quality verification/adjustment function, for example, the setting of the operation instruction of whether to carry out the image quality verification/adjustment function and the automatic carrying-out of the image quality verification/adjustment function, and the like. Furthermore, the operation/display unit 140 allows for the display of the setting content, the display of intended information such as the list of the reserved jobs, and the like.

Further, the DRAM control IC 111 is connected with a decompression IC 125 that decompresses the compressed image data, and the decompression IC 125 is connected with a write processing unit 126. The write processing unit 126 is connected with the LD 151A (laser diode) of the printer unit 150, and performs the processing of the write data that is used for the behavior of the LD 151A. Further, the printer unit 150 includes a printer control unit 152 that controls the whole (paper feed, image formation, paper ejection, post-processing and the like) of the printer unit 150, and the printer control unit 152 is connected with the above control CPU 113. The printer control unit 152 behaves in accordance with the control command from the control CPU 113, and controls the printer unit 150.

Further, the PCI bus 112 connected with the DRAM control IC 111 is connected with a DRAM control IC 161 of the image processing unit (printer & scanner controller) 160.

In the case where the image formation apparatus is used as a network printer or a network scanner, the image processing unit (printer & scanner controller) 160 receives image data or the like from the terminal (PC) 4 or the like connected with the LAN 3, by the image formation apparatus 1, and sends the image data acquired by the scanner unit 130, to the terminal (PC) 4 or the like connected with the LAN 3. In the image processing unit (printer & scanner controller) 160, the DRAM control IC 161 is connected with an image memory (DRAM) 162 that is configured by a DRAM or the like. Further, in the image processing unit (printer & scanner controller) 160, a common bus is connected with the DRAM control IC 161, a controller control CPU 163 that controls the whole of the image processing unit (printer & scanner controller) 160, a LAN interface 165, and a HDD 166. The LAN interface 165 is connected with the LAN 3.

Further, the LAN 3 is connected with the management apparatus 5 through a communication unit 501 including a LAN interface and the like, and the whole of the management apparatus 5 is controlled by a management control unit 500. The management control unit 500 is constituted by a CPU, a program to behave on the CPU, and the like. Further, the management apparatus 5 can include a storage unit 510 to store a predetermined image quality standard, a required image quality for a job and the like that are associated with a paper sheet.

Next, the basic behavior of the above image formation apparatus 1 will be described.

First, a procedure for accumulating image data in the image formation apparatus 1 will be described.

Firstly, a case of scanning an image with the scanner unit 130 and generating image data in the image formation apparatus 1 will be described. In the scanner unit 130, an image is optically scanned from a document by the CCD 131. On this occasion, the behavior control of the CCD 131 is performed by the scanner control unit 132, which receives a command from the control CPU 113. The scan of the document can be performed by the flowing-type automatic document feed apparatus (ADF) 135, or can be performed by placing the document on the platen glass 137.

The control CPU 113 behaves by a program, and issues a command to the scanner unit 130 based on an operation through the operation/display unit 140. For the image scanned by the CCD 131, the data processing is performed by the scan processing unit 116. The image data after the data processing is compressed by a predetermined method in the compression IC 118, and is stored in the compression memory 121 through the DRAM control IC 111. Further, in the case where the HDD 127 is used, the image data stored in the compression memory 121 through the DRAM control IC 111 is stored in the HDD 127.

It is allowed to set a printing condition including a printing quality level (required image quality) for a job at the time of the storing of the image data, or it is allowed to set the printing condition at the time of the printing.

In addition, the image data is input to the image formation apparatus 1 through the LAN 3. Examples of the above image data include the data generated by an application program or the like of the terminal (PC) 4 or the like, and the data generated by another image formation apparatus. The data is received by the image processing unit (printer & scanner controller) 160, through the LAN 3 and the LAN interface 165, and is temporarily stored in the image memory (DRAM) 162 or the HDD 166 by the DRAM control IC 161. The data in the above image memory (DRAM) 162 or HDD 166 is transferred to the DRAM control IC 111 through the PCI bus 112, and is temporarily stored in the page memory 122. The data stored in the page memory 122 is sequentially sent to the compression IC 118 through the DRAM control IC 111, and after the compression processing, is stored in the compression memory 121 through the DRAM control IC 111. In the case of being stored in the HDD 127, the data stored in the compression memory 121 through the DRAM control IC 111 is stored in the HDD 127.

With the storing of the image data in the above compression memory 121 or HDD 127, it is possible to set a reserved job, for example, by setting the output condition on the operation/display unit 140. A plurality of reserved jobs is managed by the control CPU 113, and the job management information is stored in a storage unit such as the nonvolatile memory 115.

In the case where the printing is performed in the image formation apparatus 1, the printing is performed in accordance with the printing condition for the job. In the case where there is a requirement (required image quality) of the printing quality level in the printing condition, the printing corresponding to the printing quality level is performed. Further, in the execution of the job, the selection of a paper sheet is performed. In the embodiment, by the paper sheet setting for a paper feed tray, the selection of the paper sheet is performed and the paper feed tray for performing the paper feed is determined. The printing condition for the job can be set so as to be previously included in the job, or can be set at the time of the printing.

Further, based on the job information, the image data stored in the compression memory 121 is sent to the decompression IC 125 through the DRAM control IC 111, and the data is decompressed. In the case of the image output of the image data stored in the HDD 127, the image data is temporarily stored in the compression memory 121 through the DRAM control IC 111, and is sent to the decompression IC 125 through the DRAM control IC 111, and the data is decompressed.

The decompressed data is sent to the write processing unit 126 through the DRAM control IC 111 so that the write data is generated, and the writing on the photoreceptor 151B is performed by the LD 151A. Further, in the printer unit 150, the control of each unit of paper feed trays (1-3) 145, the large-capacity paper feed tray 170, the conveyance unit, the image formation unit 151 and the like is performed by the printer control unit 152, which receives commands from the control CPU 113. In the printer unit 150, the image formation, the transfer on the paper sheet, the fixation, the conveyance to the post-processing apparatus (FNS) 180 through the conveyance path, the post-processing in the post-processing apparatus (FNS) 180 and the like are sequentially performed, and the printing output is performed.

Next, the setting of the quality standard for the paper sheet will be described.

When a paper sheet profile is selected, a color standard is set, and the image quality adjustment is performed such that the best quality is obtained. Meanwhile, for a predetermined paper sheet, an image is formed in the image formation unit, the image is scanned, and the image quality is decided. The image quality is a predetermined image quality standard for the paper sheet. For another paper sheet, the image is formed on the paper sheet, the image is scanned, and the image quality is decided, similarly. The image quality standard, for example, can be expressed as the color difference from the color standard. These image quality standards are stored in the nonvolatile memory, the HDD 127 or the like, while being associated with the paper sheets. Alternatively, the image quality standard can be registered as a single image quality, without being associated with the paper sheets.

The image quality level includes, as an example, the color difference by the comparison with a color chart, and the condition for actualizing the image quality level includes the paper sheet type corresponding to the image quality level. A high image quality level can be actualized on a high-quality coated paper, even if the image quality level cannot be actualized on a plain paper. Therefore, for selecting a coated paper when a high image quality level is required, the association with this is performed. Accordingly, the image quality standard varies depending on the type of the paper sheet.

Specifically, the adjustment about the color is performed, the image formation apparatus is put into the best state, and thereafter, a chart is printed on a paper sheet. The printed chart is measured by a colorimeter, and the color difference information is acquired. The acquired color difference information is displayed on the operation/display unit, and a user can judge whether to use the paper sheet while looking at the displayed color difference information. In the case of judging that it is used, the color difference information is saved while being associated with the information about the paper type of the paper sheet. Here, in the measurement for the acquiring the color difference information, for example, an inline sensor included in the image formation apparatus can be used, or an external colorimeter independent from the image formation apparatus can be used. Further, the colorimeter can be included in the image formation apparatus.

Figure 3:
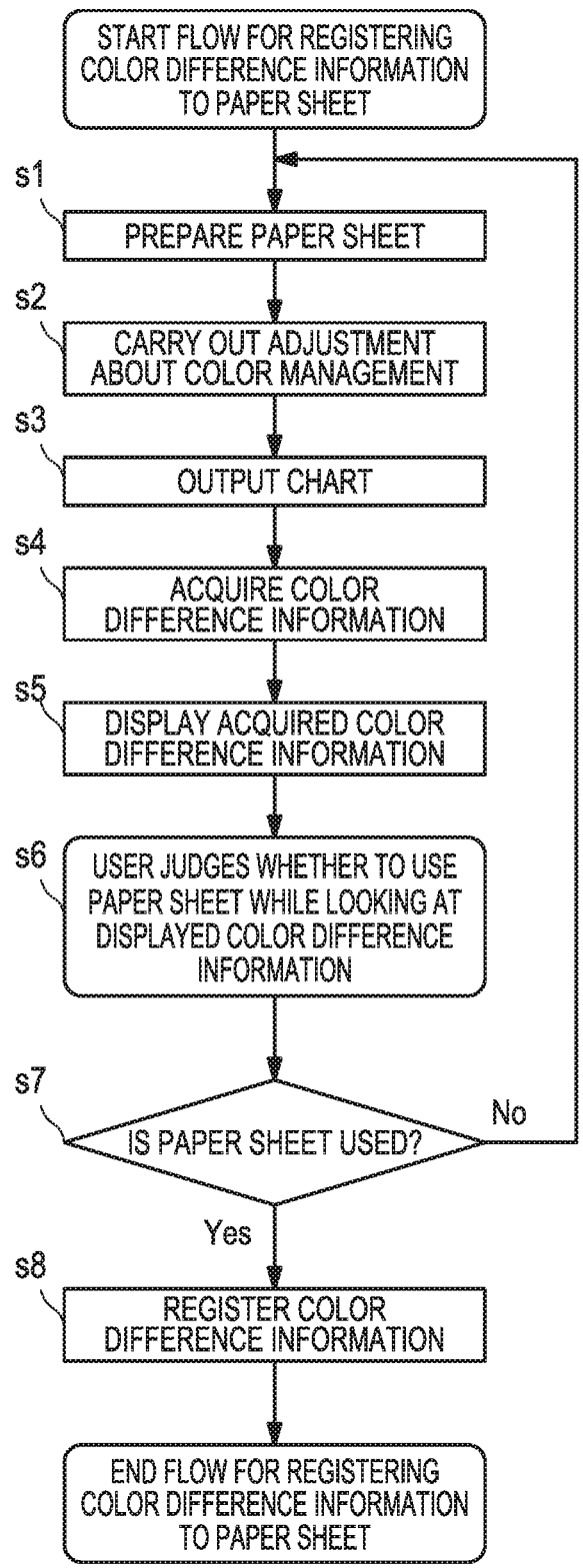
FIG. 3 is a flowchart showing a procedure for registering color difference information in the same.

First, a procedure for registering the color information to a paper sheet will be described based on a flowchart in FIG. 3. Here, the following procedure is executed by the control from the control CPU 113 included in the image formation apparatus body 10.

First, a paper sheet is prepared (step s1), and the adjustment about the color management is carried out to the image formation unit (step s2). The chart output is performed to the paper sheet prepared in step s1, in the image formation unit for which the adjustment has been carried out (step s3). As the chart, for example, a chart previously decided as the standard about the color management of the output profile can be used.

Subsequently, the printed chart is scanned by an inline sensor or a colorimeter, the scanned image and the standard about the color management are compared, and the color difference information is acquired and is displayed on the operation/display unit (step s5). Subsequently, from the displayed color information, for example, a user can judge whether to use the paper sheet (step s6). Subsequently, whether to use the paper sheet is decided (step s7). In the case of not using the paper sheet (step s7, No), the return to step s1 is made, and another paper sheet is prepared.

In the case of using the paper sheet (step s7, Yes), the color difference information is stored in a storage unit such as the nonvolatile memory (step s8), and the processing is ended.

Thus, a predetermined image quality standard associated with the paper sheet is obtained.

Here, although the predetermined image quality standard is stored in the image formation apparatus in the above description, the predetermined image quality standard can be stored while being associated with the paper sheet, in the storage unit 510 of the management apparatus 5 that manages the image formation apparatus. The predetermined image quality standard is handled by the management control unit 500.

Next, the image quality verification/adjustment function before job execution will be described.

When a job is executed, the color difference information allowed for the job is added. Before the job is executed, the color difference information registered to a paper sheet to be used and the color difference information added to the job are compared. In the case where the paper sheet is not usable (=the paper sheet does not satisfy the color difference information added to the job), an alternative paper sheet can be proposed, together with the result.

In the case where the paper sheet is usable, the user judges whether to perform the adjustment. In the case of performing the adjustment, the chart output is performed to the paper sheet. The color information (color difference information) is acquired by the color measurement of the chart with an inline sensor or the like, and is compared with the color difference information saved in advance while being associated with the paper sheet. For the color difference information saved in advance while being associated, the color measurement is performed while the image formation apparatus is in the best state, and therefore, the currently acquired result sometimes does not reach the color difference level registered in advance.

In the case where the current color difference level does not reach the advance color difference level, the user is prompted to perform the adjustment about the color, and is notified of being in an inappropriate state for the execution of the job. Here, it is allowed to notify the user of performing the adjustment and automatically carry out the adjustment.

In the following, the specific description will be made.

Figure 4:
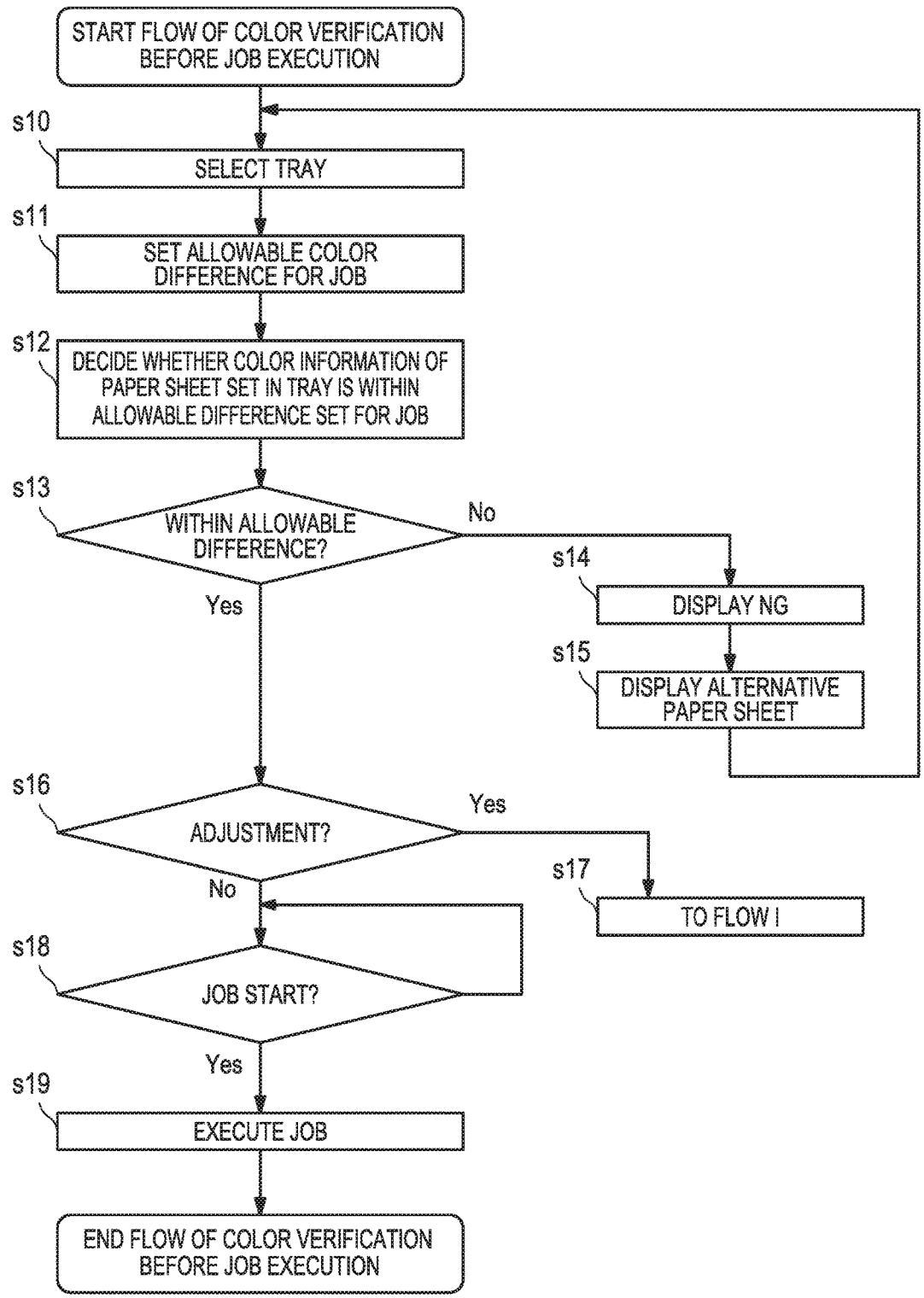
FIG. 4 is a flowchart showing a procedure for performing a color verification before job execution in the same.

First, the image quality verification before job execution will described based on a flowchart in FIG. 4.

First, a tray is selected (step s10). Thereby, a paper sheet to be used is determined.

Subsequently, an allowable color difference is set for the job (step s11). The allowable color difference corresponds to the required image quality in the present invention. Instead of the setting at the time of the execution of the job, the allowable color difference can be included in the printing condition for the job.

Subsequently, whether the color information (having the information about the allowable color difference) of the paper sheet set in the tray is within the allowable color difference set for the job is decided by comparison (step s12). The color information of the paper sheet is stored in the storage unit, and this is read out and used for the comparison. Here, in the embodiment, the allowable range is a range in which the color difference for the job is within the color difference for the paper sheet, but the allowable range can be a predetermined range in which the color difference is greater than the color difference set for the job.

Subsequently, in the case where the allowable color difference for the job is within the allowable difference in the color information as the decision result (step s13, Yes), whether to carry out the adjustment is judged (step s16). Further, in the case where the allowable color difference is not within the allowable range in the color information (step s13, No), NG is displayed as a warning on the operation/display unit 140 (step s14), an alternative paper sheet capable of satisfying the allowable difference is displayed on the operation/display unit 140 (step s15), and the transition to the tray selection processing is made (step s10). When a tray for using the alternative paper sheet is selected, the allowable color difference for the job can fall within the allowable difference. Here, it is allowed to select the alternative paper sheet automatically, in addition to the display of the alternative paper sheet.

In the case of being within the allowable difference (step s13, Yes), whether to perform the adjustment is decided (step s16). The decision can be performed by an operation instruction from the user, or the decision can be performed automatically.

In the case of receiving the operation instruction from the user, the operation/display unit inquires whether to carry out the image quality verification/adjustment. On this occasion, it is allowed to display the information relevant to the degradation of the image quality, for example, the output count, operating time, elapsed time and others after the adjustment is carried out, and it is allowed to estimate the degradation degree and perform the display of the recommendation of the carrying-out or the display of the judgment that the carrying-out is unnecessary.

Further, in the case of performing the decision automatically, it is possible to determine whether the carrying-out is necessary by estimating the degradation of the image quality from the output count, the operating time and the like and judging whether the image quality is maintained within the allowable color difference for the job. The estimation can be judged using the past information and the like.

Figure 5:
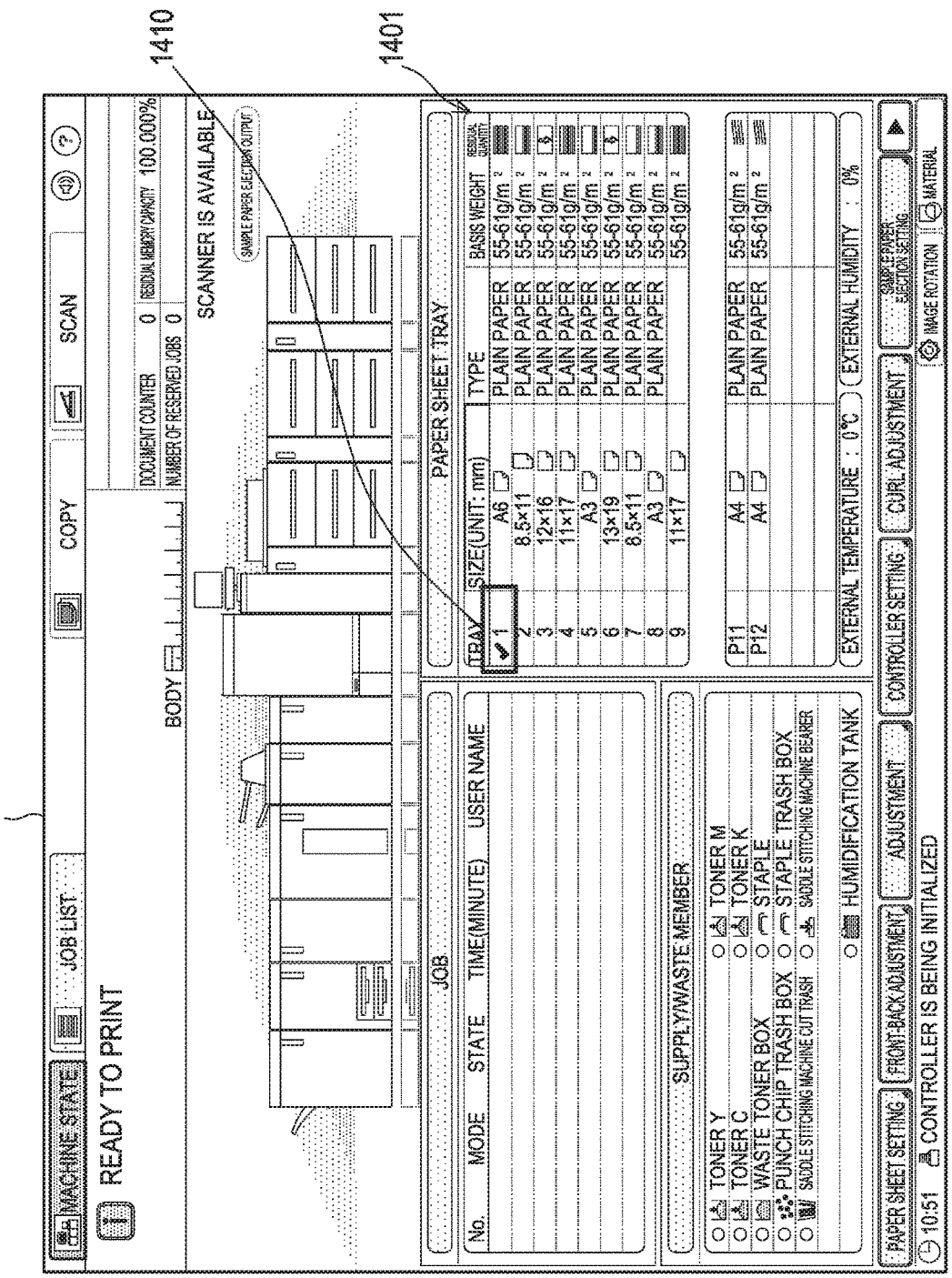
FIG. 5 is a diagram showing an exemplary screen on which a mark is put on a tray indication of a printing screen, in the same.

In the case of being within the allowable difference, the information can be displayed on a printing screen 1400 shown in FIG. 5 or the like. The printing screen 1400 is a screen that is displayed on the operation/display unit 140. As shown in FIG. 5, the printing screen 1400 has a list screen 1401 for paper sheet profiles. For a paper sheet for which it is decided to be within the allowable difference, a mark such as an icon 1410 is displayed, and thereby, it is possible to show that the job execution is possible.

The above check mark disappears at the timing when the paper sheet has been replaced, at the timing when the job using the tray has been finished, or at the timing when a fixed time has elapsed.

Figure 6:
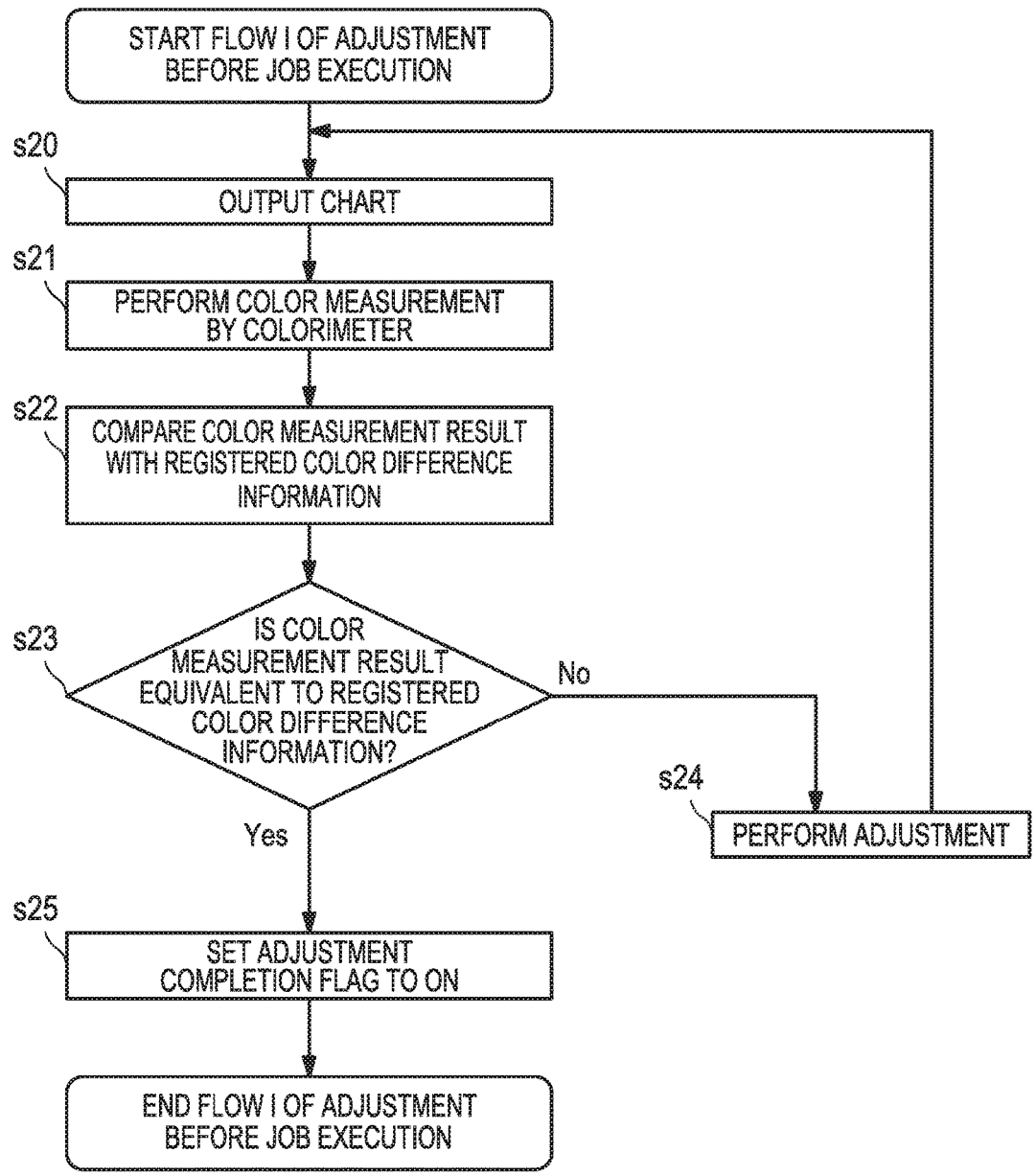
FIG. 6 is a flowchart showing a procedure for performing an image quality adjustment before job execution in the same.

In the case of performing the adjustment as the result of the decision (step s16, Yes), the transition to a procedure I shown in FIG. 6 is made (step s17). In the case of not performing the adjustment (step s16, No), whether a job start is executed is decided (step s18). The job start is executed, for example, when the user pushes a start button.

In the case of being not the job start (step s18, No), the job start is awaited. In the case of being the job start (step s18, Yes), the job is executed (step s19), and thereafter, the processing is ended.

Here, in the above description, the verification of the image quality is performed in the image formation apparatus. Therefore, in this case, the control CPU 113 functions as the control unit in the present invention.

However, in the present invention, the verification of the image quality can be performed in the management apparatus 5. In this case, the management control unit 500 functions as the control unit in the present invention.

Further, it is allowed to perform the operation instruction of whether to perform the adjustment, or the like, in the management apparatus 5, the terminal (PC) 4 or the like.

Next, a procedure of the image quality adjustment of the image quality verification/adjustment function will be described based on a flowchart in FIG. 6. The following procedure is executed by the control from the control CPU 113.

First, a chart is output on the paper sheet for the selected tray (step s20), and is measured by a colorimeter (step s21). As the colorimeter, an inline colorimeter can be used, or an external colorimeter independent from the image formation apparatus can be used. The color measurement result is compared with the registered color difference information (predetermined image quality standard) (step s22), and whether the color measurement result is equivalent to the registered color difference information is judged (step s23). For example, whether the color measurement result is equivalent can be judged by whether it falls within a previously decided allowable range.

When the color measurement result is not equivalent to the registered color difference information (step s23, No), the image quality adjustment is performed (step s24), and the transition to step s20 is made so that the output of the chart, the color measurement (step s21) and the like are repeated. When the color measurement result becomes equivalent to the registered color difference information (step s23, Yes), the adjustment completion flag is set to ON (step s25), and the processing is ended.

Similarly to FIG. 5, when the adjustment completion flag is set to ON, it is allowed to display an icon as a mark while it is associated with the paper sheet. On this occasion, for the distinction from the icon that is displayed when the predetermined image quality standard is within the allowable range of the standard for the job, it is allowed to display an icon having different shape, form or the like.

It is allowed that the above check mark disappears at the timing when the paper sheet has been replaced, at the timing when the job using the tray has been finished, or at the timing when a fixed time has elapsed.

Further, when the adjustment completion flag is set to ON, it is allowed to perform a display showing the completion of the adjustment, to the operation/display unit. On this occasion, it is possible to save the verification history and check later at what timing the verification was performed. The user can check the display of the history and can judge whether to perform the verification again.

After the adjustment is performed, the comparison is automatically performed again, and the result is displayed. In the case where the result of NG is obtained even after the readjustment, the adjustment and the verification are performed again. Practically, in most cases, OK is obtained by performing the adjustment one time, and even if NG is obtained, OK is obtained by performing the adjustment two or three times.

Here, in this mode, the standard for the decision is that the image quality of the scanned image is equivalent to the registered color difference information, but it is allowed to perform the processing as the adjustment completion when the color difference information for the job is within the allowable range.

In the above embodiment, it is possible to have the standard of the color management for each paper sheet, and it is possible to select an optimal paper sheet for the job.

Then, in the configuration in which the color information such as the color difference can be saved while being associated with the paper sheet, the adjustment is performed before job execution, using the color information, and thereby, it is possible to verify whether the registered color difference information falls within the allowable range set for the job.

In the embodiment, it is possible to record the color difference information for each paper sheet, and because of recording the color difference information for each paper sheet, it is possible to perform the decision, without being limited to within a single job.

Further, in the embodiment, it has been described that the adjustment is automatically performed in the case where the image quality of the job is within the allowable difference, where the selection is performed such that the adjustment is performed and where the color difference information is not equivalent. However, on this occasion, it is allowed that whether to perform the adjustment is decided, and it is allowed that the user can perform the operation instruction of whether to perform the adjustment.

Here, it has been described that the above image quality adjustment is controlled by the control CPU 113 of the image formation apparatus, but it is allowed that the above image quality adjustment is controlled by the management control unit of the management apparatus. Further, it is allowed that one of the image quality verification function and the image quality adjustment function is performed by the image formation apparatus and the other is performed by the management apparatus. The image quality verification function and the image quality adjustment function correspond to the image quality verification/adjustment function.

The embodiment has the effect that it is possible to avoid a vain image quality adjustment from being performed in the case where the image quality standard of the image formation apparatus does not reach the required characteristic for the job, it is possible to decide whether the performance can be exerted by the image quality verification/adjustment function, it is possible to perform the adjustment when the performance cannot be exerted and the adjustment does not have to be performed if it is unnecessary.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image formation apparatus comprising:
   an image formation unit that forms an image on a transfer medium based on a job, the job including a required image quality; and
   a controller that controls the image formation unit, the controller having
      an image quality verification function to compare, based on a scan result for the image formed by the image formation unit, an image quality of the scanned image and a predetermined image quality standard, and
      an image quality adjustment function of the image formation unit such that the image quality of the image is within an allowable range of the predetermined image quality standard, the image quality adjustment occurring when the image quality of the scanned image is not within the allowable range of the predetermined image quality standard, and
   the controller, having a carrying-out procedure to carry out the image quality verification and adjustment functions, comparing the required image quality for the job and the predetermined image quality standard before the carrying-out procedure, and deciding whether the image for the job satisfies the required image quality for the job.

2. The image formation apparatus according to claim 1, wherein the controller performs a warning in a case of judging that the image for the job is unable to satisfy the required image quality even by the image quality verification and adjustment functions in the decision.

3. The image formation apparatus according to claim 2, comprising a display that is controlled by the controller, wherein the controller displays the warning on the display.

4. The image formation apparatus according to claim 1, wherein the required image quality is associated with the type of transfer medium to be used for the job, and the predetermined image quality standard is associated with the type of transfer medium to be used for printing.

5. The image formation apparatus according to claim 4, wherein the controller presents an alternative transfer medium in a case of judging that the image for the job is unable to satisfy the required image quality even by the image quality verification and adjustment functions in the decision, the alternative transfer medium allowing the image for the job to satisfy the required image quality by the image quality verification and adjustment functions.

6. The image formation apparatus according to claim 1, wherein the controller performs a decision of whether to execute the carrying-out procedure for the image quality verification and adjustment functions, in a case of judging that the image for the job is able to satisfy the required image quality by the image quality verification and adjustment functions.

7. The image formation apparatus according to claim 1, wherein a decision of whether to execute the image quality verification and adjustment is performed by an operation instruction by a user or automatically performed in consideration of an image quality change in the image formation unit.

8. The image formation apparatus according to claim 7, wherein the image quality change is decided based on a printing count for the transfer medium or an operating time of the image formation unit after the image quality adjustment.

9. The image formation apparatus according to claim 1, wherein the controller performs a decision of whether to perform the image quality adjustment, in the image quality verification and adjustment functions, after comparing the image quality of the scanned image and the predetermined image quality standard.

10. The image formation apparatus according to claim 9, wherein the controller performs the decision of whether to carry out the image quality adjustment depending on an operation instruction by a user, or automatically performs the decision according to the comparison result.

11. The image formation apparatus according to claim 1, wherein the controller performs the adjustment until the image quality of the scanned image becomes at least equal to or higher than the required image quality, in a case of deciding that the image for the job is able to satisfy the required image quality by the image quality verification and adjustment functions and performing the image quality verification and adjustment.

12. The image formation apparatus according to claim 11, wherein the controller carries out the image quality verification and adjustment functions until the scanned image becomes within the allowable range of the predetermined image quality standard.

13. The image formation apparatus according to claim 1, wherein the controller displays a mark on an indication of a tray, in a case of deciding that the image for the job is able to satisfy the required image quality by the image quality verification and adjustment functions, the tray being a tray from which a transfer medium to be used for the job is fed.

14. The image formation apparatus according to claim 1, wherein the controller displays a mark on an indication of a tray, in a case where the image quality of the scanned image satisfies the required image quality as a result of the image quality adjustment, the tray being a tray from which a transfer medium to be used for the job is fed.

15. The image formation apparatus according to claim 13, wherein the controller makes the mark disappear, in a case where the transfer medium to be used is altered, in a case where the job is completed or in a case where a fixed time has elapsed.

16. The image formation apparatus according to claim 1, wherein the controller records information about time when the image quality adjustment is performed, and allows timing of the last image quality adjustment to be checked.

17. The image formation apparatus according to claim 1, wherein the scan result for the image is a result by a scan apparatus that is included in the image formation apparatus, or a result that is externally detected.

18. An image formation system comprising:
   an image formation unit that forms an image on a transfer medium based on a job, the job including a required image quality; and
   a controller that controls the image formation unit, the controller having
      an image quality verification function to compare, based on a scan result for the image formed by the image formation unit, an image quality of the scanned image and a predetermined image quality standard, and
      an image quality adjustment function of the image formation unit such that the image quality of the image is within a predetermined allowable range of the predetermined image quality standard, the image quality adjustment occurring when the image quality of the scanned image is not within the allowable range of the predetermined image quality standard, and
   the controller further, having a carrying-out procedure for the image quality verification and adjustment functions, comparing the required image quality for the job and the predetermined image quality standard before the carrying-out procedure, and deciding whether the image for the job satisfies the required image quality for the job.

19. A management apparatus that manages an image formation apparatus, the management apparatus comprising:
   a communicator that communicates with the image formation apparatus; and
   a controller that controls an image formation unit, the image formation unit forming an image on a transfer medium based on a job through the communicator, the job including a required image quality,
   the controller having
      an image quality verification function to compare, based on a scan result for the image formed by the image formation unit, an image quality of the scanned image and a predetermined image quality standard, and
      an image quality adjustment function of the image formation unit such that the image quality of the image is within a predetermined allowable range of the predetermined image quality standard, the image quality adjustment occurring when the image quality of the scanned image is not within the allowable range of the predetermined image quality standard, and
   the controller further, having a carrying-out procedure for the image quality verification and adjustment functions, comparing the required image quality for the job and the predetermined image quality standard before the carrying-out procedure, and deciding whether the image for the job satisfies the required image quality for the job.

* * * * *